United States Patent [19]

Ng

[11] Patent Number: 5,268,961
[45] Date of Patent: Dec. 7, 1993

[54] ERROR CONTROL APPARATUS FOR A DIGITAL VIDEO SIGNAL PROCESSING SYSTEM

[75] Inventor: Sheau-Bao Ng, Cranbury, N.J.

[73] Assignee: General Electric Co., Princeton, N.J.

[21] Appl. No.: 932,537

[22] Filed: Aug. 20, 1992

[51] Int. Cl.$^5$ .............................. H04N 7/167
[52] U.S. Cl. .................. 380/19; 380/10; 380/17; 380/14
[58] Field of Search .......... 380/10, 19, 17, 14

[56] References Cited

U.S. PATENT DOCUMENTS

| | | | |
|---|---|---|---|
| 4,608,456 | 8/1986 | Paik et al. | 380/17 |
| 4,613,901 | 9/1986 | Gilhousen et al. | 380/19 |
| 4,663,659 | 5/1987 | Blatter | 380/14 |
| 5,010,405 | 4/1991 | Schreiber et al. | 358/141 |
| 5,091,936 | 2/1992 | Katznelson et al. | 380/19 |

Primary Examiner—David C. Cain
Attorney, Agent, or Firm—Joseph S. Tripoli; Eric P. Herrmann; Ronald H. Kurdyla

[57] ABSTRACT

In a system for coding and decoding a digital television signal, a signal representing residual image information is transformed into plural subband signals representing vertical and horizontal frequencies, and quantized. To mitigate the effects of transmission channel errors, the quantized subband signals are scrambled by line shuffling before being data compressed prior to transmission. Inverse operations including decoding, line reshuffling, dequantization and subband synthesis occur at a receiver.

13 Claims, 4 Drawing Sheets

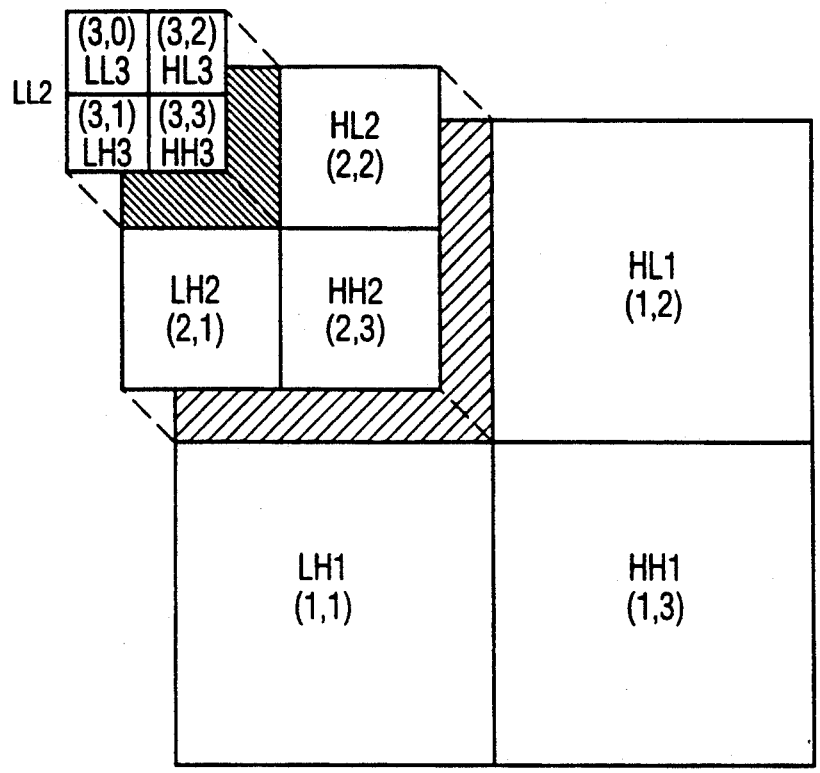
FIG. 4
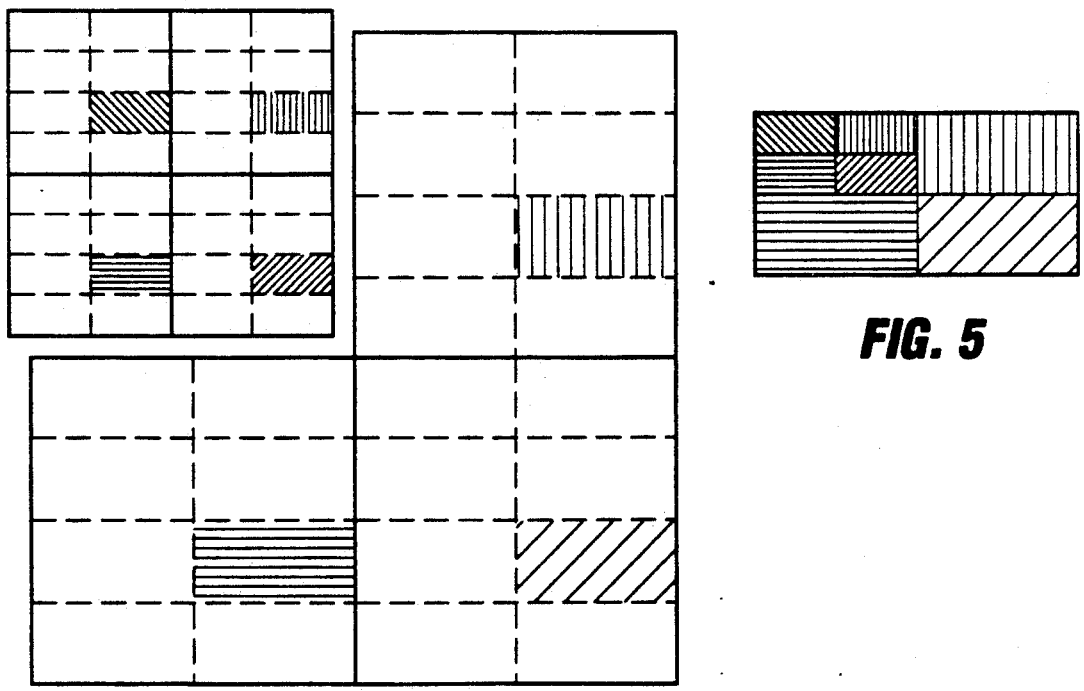
FIG. 5
FIG. 6

ERROR CONTROL APPARATUS FOR A DIGITAL VIDEO SIGNAL PROCESSING SYSTEM

FIELD OF THE INVENTION

This invention concerns a system, including data compression apparatus, for processing an image representative signal such as a television signal. In particular, this invention concerns apparatus for mitigating the effects of transmission error in a digital video compression system relying substantially on temporal predictive coding.

BACKGROUND OF THE INVENTION

Transmission error is a potentially serious problem for a broadcast digital video such as a high definition television (HDTV) signal. For example, a broadcast television signal compressed by means of a sophisticated digital image compression algorithm may suffer severe image degradation due to moderate to high transmission channel impairments such as thermal noise. In systems employing motion compensation algorithms, as is common, the results of transmission channel impairments can be catastrophic.

Channel errors can be controlled by using error confinement techniques to contain errors within one or more known regions of the image. Once the error is contained, a variety of known error concealment techniques can be employed. Error confinement can be achieved by transmitting the data in transport blocks as is known. Transport block header data may include a code such as a cyclic redundancy code to provide a measure of error protection. The error code is typically capable of correcting only relatively small errors, though larger errors may be detected but not corrected. At a receiver, a transport block containing an error is flagged, and the region in the reconstructed image to which such transport block pertains can then be subjected to a process of error concealment.

Conventional error confinement and concealment techniques work well in the reconstructed image domain. In other words, the effect of the error on the reconstructed image is confined, and the error concealment is applied to the reconstructed image. Currently, most video compression systems rely substantially on temporal predictive algorithms to produce the desired data compression. In such cases, the parts of the transmitted data that are subject to transmission impairment are primarily motion information, compression parameters and residual image information (i.e., prediction error image information).

It is herein recognized that the residual image information often represents a significant portion of the total image information. As a result, transmission impairments are applied primarily to the residual image rather than to the reconstructed displayed image.

SUMMARY OF THE INVENTION

Apparatus according to the principles of the present invention performs channel error control on the residual image, rather than on the displayed image, by dispersing the error throughout the image, e.g., among many scan lines.

In an illustrated preferred embodiment of the invention, an image representative signal is decomposed into plural subbands, whereby transmission error is dispersed in both spatial and frequency domains. Thus more image regions are in partial error than complete error, whereby partial error is in the form of certain erroneous spatial frequency bands, and the overall effect of channel impairment is mitigated. Because the residual image now has erroneous spatial frequency components, error concealment can be applied to the residual image. By dispersing the error into frequency subbands, powerful error concealment techniques such as line interpolation can be effectively applied directly to the residual image. Applying such error concealment techniques to the residual image rather than to the reconstructed image is considered to produce a preferable visual effect.

BRIEF DESCRIPTION OF THE DRAWINGS

FIGS. 3-6 depict aspects of subband decompositions helpful in understanding the operation of the apparatus in FIG. 1.

DETAILED DESCRIPTION OF THE DRAWINGS

Figure 1:
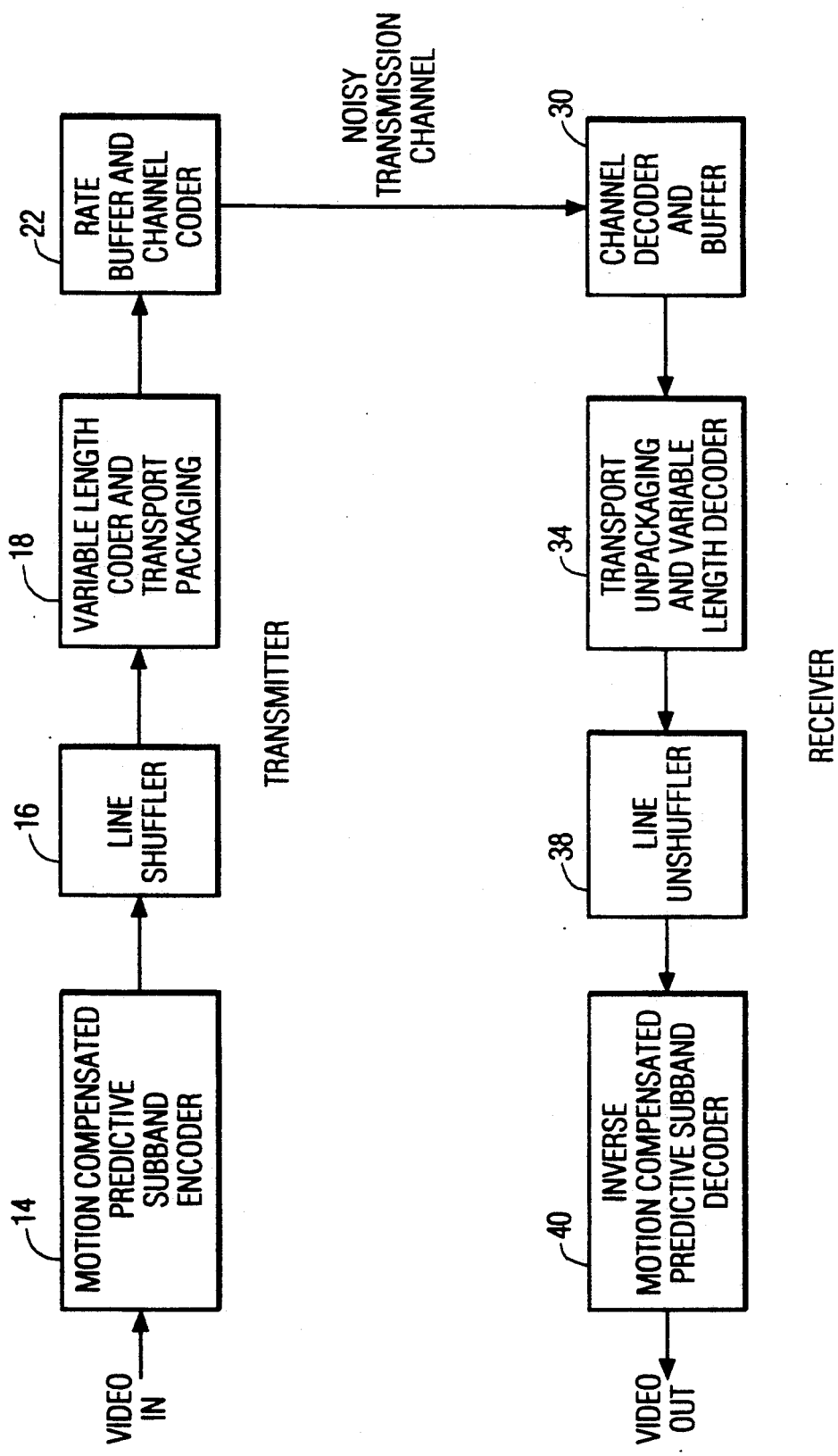
FIG. 1 is a block diagram of transmitter and receiver apparatus according to the present invention.

The system shown in FIG. 1 performs data compression at a transmitter by means of a motion compensated predictive subband encoder 14 which receives an input image representative digital video signal. Unit 14 employs known signal processing techniques including known motion compensation and subband quantization algorithms. The output signal from unit 14 comprises a plurality of quantized signals representing horizontal and vertical frequency decompositions of the input video signal, as will be explained in connection with FIGS. 3 and 4. Details of unit 14 will be discussed in connection with FIG. 2. The signals from unit 14 are individually scrambled by line shuffling networks in a unit 16. Scrambled subband decomposition signals from line shuffling unit 16 are subjected to variable length coding, i.e., data compression, and transport data block packaging in a unit 18. The variable length coding includes, for example, run length and Huffman coding as known. The transport block packaging formats the digital video signal from unit 16 into image data block segments, as will be shown, which are conveyed to unit 22 in concatenated form. In this example each transport block is a data block representing a portion of an image area. A header associated with each data block contains an address of the data block for identifying its location. The use of such data blocks has been found to facilitate the variable length coding process. Plural coders can operate in multiplexed or parallel fashion upon different parts of the image, at a slower coding rate.

Since the variable length coded video signal from unit 18 typically exhibits a non-uniform data rate, a unit 22 includes a rate buffer for translating data from unit 18 to a substantially constant data rate consistent with transmission channel requirements. Unit 22 also includes a coder which formats the signal for transmission over a preselected broadcast or cable transmission channel, which typically are noisy. At a receiver, units 30, 34, 38 and 40 perform the inverse of the functions performed by transmitter units 22, 18, 16 and 14, respectively.

Figure 2:
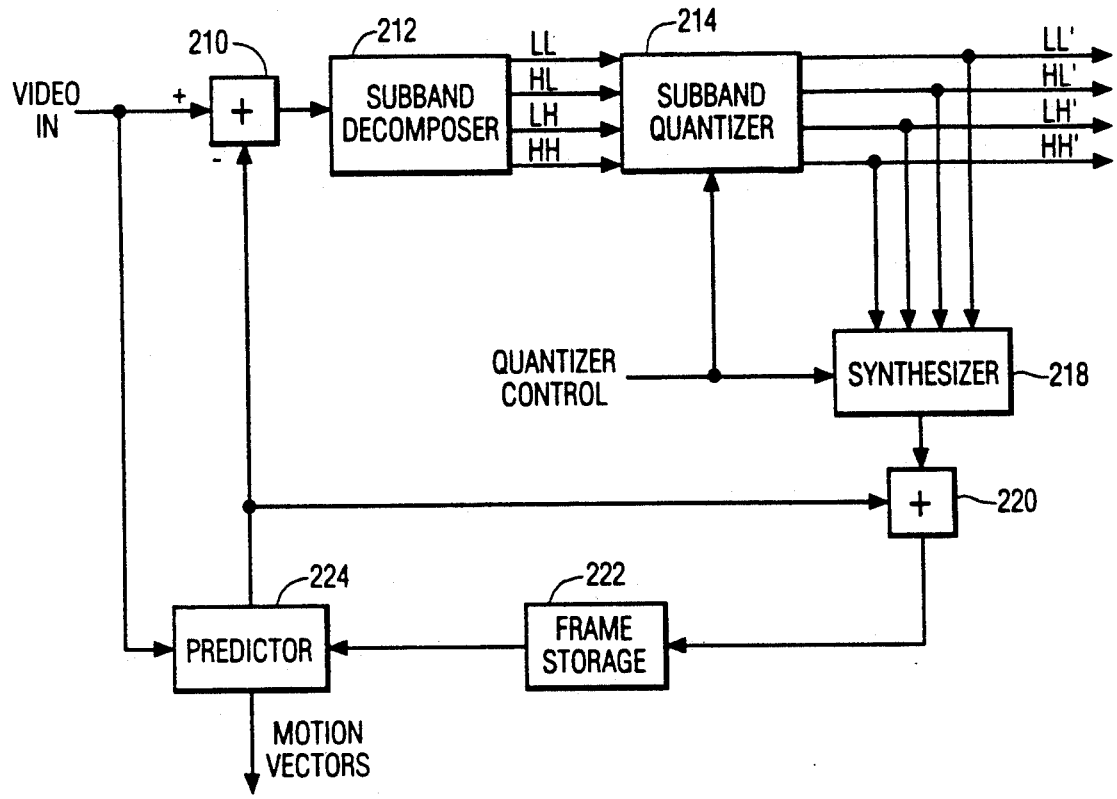
FIGS. 2 and 7 respectively show portions of the receiver and transmitter apparatus of FIG. 1 in greater detail.

FIG. 2 shows additional details of unit 14. The video input signal is applied to a non-inverting (+) input of a subtractive combiner 210. An inverting (−) input of subtractive combiner 210 receives a prediction signal from a predictor 224, which receives a current video signal and a stored video signal from a frame storage device 222. A typical image predictor divides the current input video image into subareas and then compare each of the subareas against prior occurring images stored in frame storage unit 222. When the subarea in frame storage unit 222 which best matches the subarea of the current image being processed is determined, pixel (picture element) values of the matching subarea stored in unit 222 are applied to combiner 210, and are subtracted from the pixel values of the current input image subareas. The differences or residues for each input subarea and the associated motion vectors constitute the image information to be transmitted.

Figure 3:
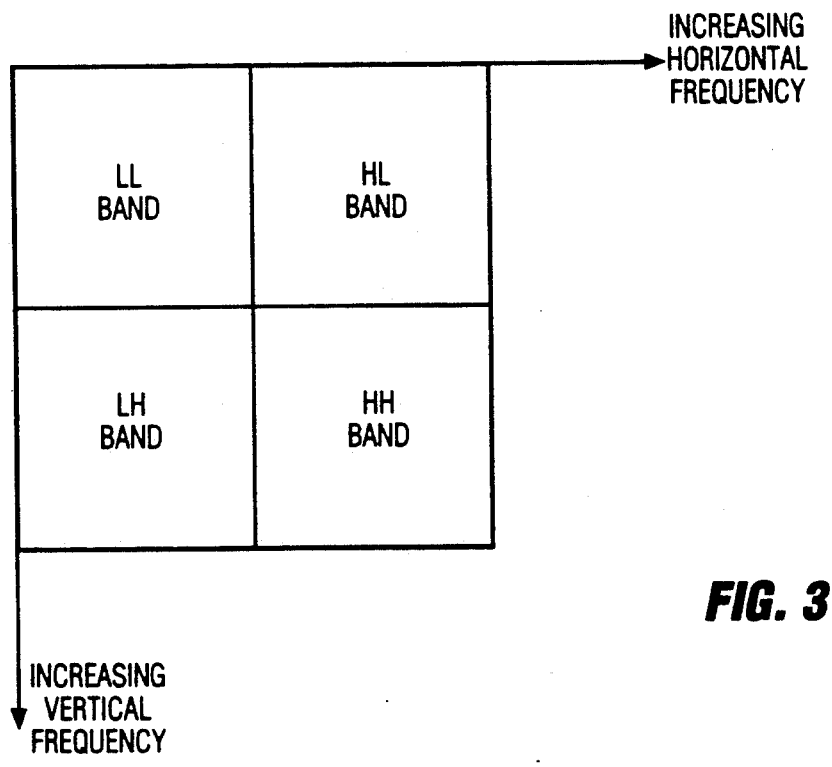

Unit 212 decomposes the residue image signal developed at the output of combiner 210 into plural horizontal and vertical frequency subbands by means of a known process involving horizontal and vertical filtering and subsampling, for example. The decomposed plural subband signals are designated LL, HL, LH and HH and represent selected spatial frequency bands. FIG. 3 is a pictorial representation of how the subbands are organized. The subband signals are quantized by a unit 214 in response to a quantizer control signal, normally provided by the rate buffer (unit 22, FIG. 1), to produce quantized subband signals LL', HL', LH' and HH'. In the nomenclature for these signals, the first letter denotes horizontal frequency and the second letter denotes vertical frequency. Specifically, subband signal LL comprises the low horizontal frequency band and the low vertical frequency band, and represents primarily low frequency information. Signal LH comprises the low horizontal frequency band and the high vertical frequency band, and represents primarily vertical edge information. Signal HL comprises the high horizontal frequency band and the low vertical band, and represents primarily horizontal edge information. Signal HH comprises the high horizontal frequency band and the high vertical frequency band, and represents primarily diagonal edge information. Output signals from unit 214 represent quantized spatial frequency band information, and are applied to line shuffling unit 16 in FIG. 1.

The quantized subbands are also coupled to a synthesizer 218 which performs inverse quantization on the respective subbands, and then performs subband recomposition to regenerate a signal representing the residual image. This residual image signal is applied to an adder 220. Pixel values from the subarea stored in unit 222, corresponding to the subarea from which the residual values were generated, are applied to a second input of adder 220 via predictor 224. The output values generated by adder 220 substantially mirror the input pixel values of the input image. These pixel values are stored in unit 222 for use in predicting the next occurring image frame.

Successive decomposition of the LL subband is sometimes used to obtain a subband pyramid comprising more than one subband decomposition level. This is illustrated in FIG. 4, which depicts components of a four level pyramid (including the original residual signal being decomposed). Other subband representations could also be used with the disclosed system. In FIG. 4, a first subband decomposition level is the decomposition of the residual image ("0" level). The first level includes subbands LL1 (not shown specifically since it is decomposed into the second level subbands), LH1, HL1 and HH1. Indices for the first level subbands are respectively given as (1,0) (not shown), (1,1), (1,2) and (1,3). The first number of each index refers to the pyramid level, with "0" being the original residue image level and higher numbers designating higher decomposition levels. The second number within each index refers to a band within a decomposition level. The second and third subband levels are similarly designated. Each successive subband level is produced by decomposing the LL subband of the preceding subband level.

A two level subband decomposition is used in a preferred implementation of the disclosed system. Line shuffler 16 in FIG. 1 shuffles the image lines of each subband according to a predetermined pseudo-random sequence which is also known by a decoder at the receiver. Each subband is line shuffled according to a different, predetermined pseudo-random sequence. Variable length coder 18 generates the variable length codes for each subband according to statistics predetermined for each subband.

FIG. 5 illustrates a rectangular shaped transport data block with two subband decomposition levels. FIG. 6 illustrates the two level subband components of the single data block of FIG. 5 in the context of a two level subband decomposition which includes several other rectangular data blocks. Each subband includes a similar, fixed number (4×8) of transport blocks. Because of the relationship among the subbands from one decomposition level to another within the subband pyramid structure, a block of dimensions x by y in a level 2 subband, for example, pertains to the same spatial region in the residue image as a 2x by 2y block in a level 1 subband. The indices of corresponding data blocks from among the various subbands are easily calculated.

Each data block header includes data indicating the address coordinates of all corresponding subband blocks. For example, the Nth data block header contains data identifying the Nth x by y data blocks in bands (2,0), (2,1), (2,2) and (2,3), and the Nth 2x by 2y data blocks in bands (1,1), (1,2) and (1,3). FIG. 6 illustrates this relationship. In practice, data block dimensions x and y may be equal or unequal depending upon whether a square or rectangular shaped data block is preferred for error confinement purposes.

At the receiver, after error detection processing whereby corrupted, erroneous data blocks are identified as is known, a variable length decoder decodes the error-free data, and the residue image line shuffled subband pyramid is reconstructed. At this point, each erroneous data block will result in blocks of erroneous data being dispersed throughout the pyramid levels. Absent the use of the disclosed line shuffling and re-shuffling operations, these erroneous blocks would cause an entire contiguous region of a reconstructed image to be in error. The disclosed line shuffling operation mitigates the effects of such errors associated with erroneous data blocks. In this example each band is line re-shuffled in the inverse order of the line shuffling at the transmitter.

Since the lines are re-shuffled at the receiver (with the inverse of the transmitter shuffling sequence), information associated with corrupted data blocks within each band is dispersed in an entirely different manner, i.e., non-contiguously. Since corrupted lines are likely to be isolated from one another after re-shuffling (except in cases of severe channel corruption), error concealment procedures can be applied more effectively. With the disclosed system, adequate error concealment may result in the context of a quantized subband system by setting the values of corrupted lines to zero, since reconstruction itself will provide error concealing interpolation of the corrupted lines, although vertical aliasing may result.

Figure 7:
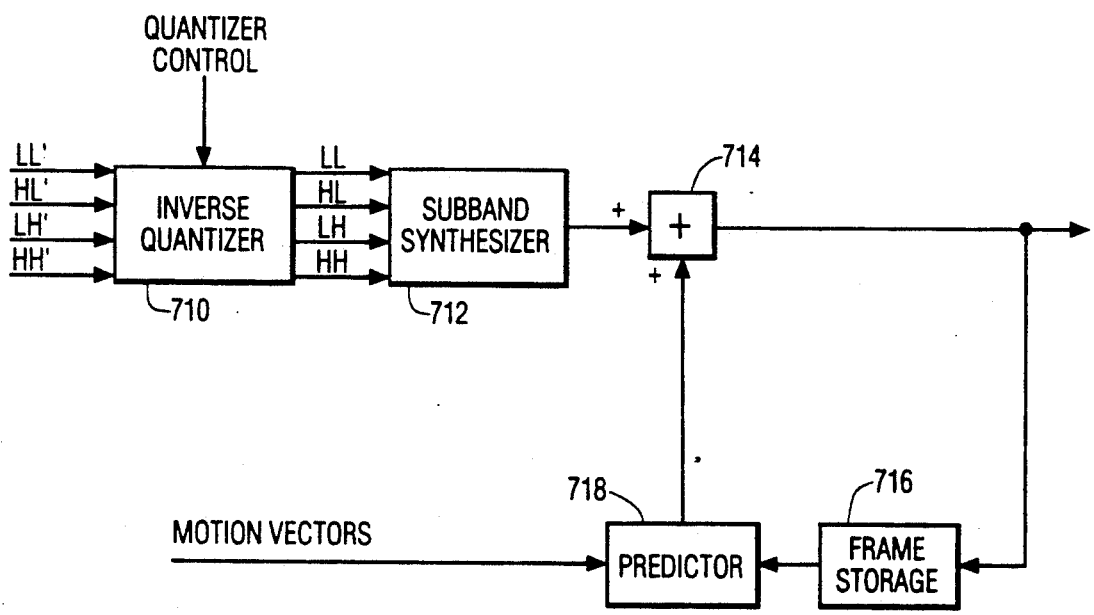

FIG. 7 shows details of inverse subband quantizer 40 in FIG. 1. The arrangement shown in FIG. 7 is conventional. Quantized residue image subband signals LL', HL' LH' and HH' are de-quantized by unit 710 using the inverse of the quantization procedure used at the transmitter, producing output signals LL, HL, LH and HH. These residual image subband signals are applied to a synthesizer 712 which recombines the subbands to form a reconstructed image residue signal.

The reconstructed residue values are applied to an adder 714. A predictor 718, responsive to transmitted motion vectors, applies corresponding predicted pixel values from frame storage unit 716 to a second input of adder 714. The combination of prediction values and residue values constitute a decompressed image signal at the output of adder 714. This decompressed image signal is provided to, for example, a display processor (not shown) and to the input of frame storage unit 716 for use in generating prediction values for subsequent frames.

The statistical properties of the signal being coded have a significant impact on the data compression efficiency of statistical coding, such as the variable length coding employed in the illustrated system. In this regard a common practice is to code both non-zero values and runs of consecutive zero values within each data block. Therefore changes in first and second order statistics in the horizontal direction will have an impact upon the coding efficiency of a variable length coder. The disclosed line shuffling process, being a vertical re-ordering process, advantageously leaves the horizontal statistics intact, and will not adversely affect the coding efficiency of the system.

In a variant of the disclosed system, line shuffler 16 shuffles line segments, where each line segment corresponds to that part of a line which will be contained within a data block. In this case, horizontal line segment shuffling can be accomplished without disturbing the horizontal statistics of the signal segment within each data block. Channel error is advantageously dispersed into both vertical and horizontal space, and into spatial frequency bands. Compression coding efficiency remains unchanged since the horizontal statistics within a data block remain unchanged. In addition, the visual impact of a corrupted data block is further reduced because corrupted data is dispersed over a larger area in both spatial and frequency domains.

What is claimed is:

1. In a system for processing an image representative digital signal, apparatus comprising:
    means responsive to said image representative signal for providing a video signal representing residual image information;
    means for scrambling said residual image information; and
    means for data compressing said scrambled residual image information.

2. A system according to claim 1, and further including
    means for decomposing said residual image information into a plurality of subbands comprising horizontal and vertical frequencies, each of said subbands being scrambled by said scrambling means.

3. A system according to claim 1, wherein
    said scrambling means shuffles lines of said residual image information.

4. A system according to claim 1, wherein
    said scrambling means shuffles prescribed segments of lines of said residual image information.

5. A system according to claim 4, and further including
    means for formatting said image information into data block segments; and
    said line segments are associated with respective ones of said data blocks.

6. A system according to claim 1, wherein
    said means for providing said video signal representing residual image information comprises predictor means providing a difference between current image information and stored image information, said difference corresponding to said residual image information.

7. In a system for receiving an image representative digital signal representing data compressed scramble residual image information, apparatus comprising
    means for decompressing said scrambled residual image information;
    means for unscrambling residual image information from said decompressing means; and
    means for processing said unscrambled residual image information to produce an image representative signal.

8. Apparatus according to claim 7, wherein
    said scrambled residual image signal comprises a plurality of scrambled subbands comprising horizontal and vertical frequencies;
    said unscrambling means unscrambles said plural subbands; and
    said processing means includes means for synthesizing said plural subbands to produce said image representative signal.

9. A system according to claim 7, wherein
    said unscrambling means reshuffles lines of said residual image information.

10. A system according to claim 9, wherein
    said unscrambling means reshuffles prescribed segments of lines of said residual image information.

11. A system according to claim 10, wherein
    said received signal contains image information in data blocks; and
    said line segments are associated with respective ones of said data blocks.

12. A system according to claim 7, wherein
    said residual image information corresponds to a difference between current image information and stored image information.

13. A system according to claim 7, wherein said processing means includes
    prediction means for developing predicted image information; and
    means for combining said predicted image information with said unscrambled residue image information to produce said image representative signal.

* * * * *